US008486177B2

(12) United States Patent
Batterham et al.

(10) Patent No.: US 8,486,177 B2
(45) Date of Patent: Jul. 16, 2013

(54) HEAP LEACHING

(75) Inventors: Robin John Batterham, Parkville (AU); Lucy Esdaile, Fitzroy (AU); Raymond Walter Shaw, Carlton North (AU)

(73) Assignee: Technological Resources Pty Ltd, Melbourne, Victoria (AU)

( * ) Notice: Subject to any disclaimer, the term of this patent is extended or adjusted under 35 U.S.C. 154(b) by 0 days.

(21) Appl. No.: 13/565,367

(22) Filed: Aug. 2, 2012

(65) Prior Publication Data
US 2012/0301392 A1   Nov. 29, 2012

Related U.S. Application Data

(63) Continuation of application No. 10/516,387, filed as application No. PCT/AU03/00682 on May 30, 2003.

(30) Foreign Application Priority Data

May 31, 2002   (AU) ........................................ PS2735

(51) Int. Cl.
*C21B 15/00* (2006.01)
*C22B 15/00* (2006.01)

(52) U.S. Cl.
USPC .............................................. 75/743; 75/712

(58) Field of Classification Search
USPC .................................. 423/658.5; 75/743, 712
See application file for complete search history.

(56) References Cited

U.S. PATENT DOCUMENTS

| | | | |
|---|---|---|---|
| 4,017,309 A | 4/1977 | Johnson | |
| 4,091,070 A | 5/1978 | Riggs et al. | |
| 4,256,705 A | 3/1981 | Heinen et al. | |
| 4,526,615 A | 7/1985 | Johnson | |
| 4,684,404 A | 8/1987 | Kalocsai | |
| 4,739,973 A | 4/1988 | Herndon | |
| 4,960,584 A * | 10/1990 | Brown | 423/658.5 |
| 5,005,806 A | 4/1991 | Krauth | |
| 5,030,279 A | 7/1991 | Krauth | |
| 5,603,750 A | 2/1997 | Sierakowski et al. | |
| 5,820,066 A | 10/1998 | Jaramillo et al. | |
| 6,053,964 A | 4/2000 | Harrell | |
| 6,110,253 A | 8/2000 | Kohr et al. | |
| 6,149,711 A | 11/2000 | Lane | |
| 6,176,997 B1 | 1/2001 | Shelp et al. | |
| 6,216,962 B1 | 4/2001 | Krieg | |
| 6,312,500 B1 | 11/2001 | Duyvesteyn et al. | |
| 6,383,458 B1 | 5/2002 | Brierley et al. | |

FOREIGN PATENT DOCUMENTS

| | | |
|---|---|---|
| AU | 199878560 B2 | 2/1999 |
| WO | 0144519 A1 | 6/2001 |
| WO | 0175184 A2 | 10/2001 |
| WO | 02061155 A1 | 8/2002 |

\* cited by examiner

*Primary Examiner* — Weiping Zhu
(74) *Attorney, Agent, or Firm* — The Webb Law Firm

(57) ABSTRACT

A method of leaching a metal value from a heap of a metal-containing ore and a heap leaching operation are disclosed. The method includes establishing a downward flow of a leach liquor through a section of the heap by supplying the leach liquor onto a top surface of the section and allowing the leach liquor (containing metal values in solution) to drain from a lower part of the section. The method is characterized by supplying the leach liquor onto the top surface of the section at a flow rate that is sufficient so that the downwardly flowing leach liquor saturates the section of the heap.

17 Claims, 1 Drawing Sheet

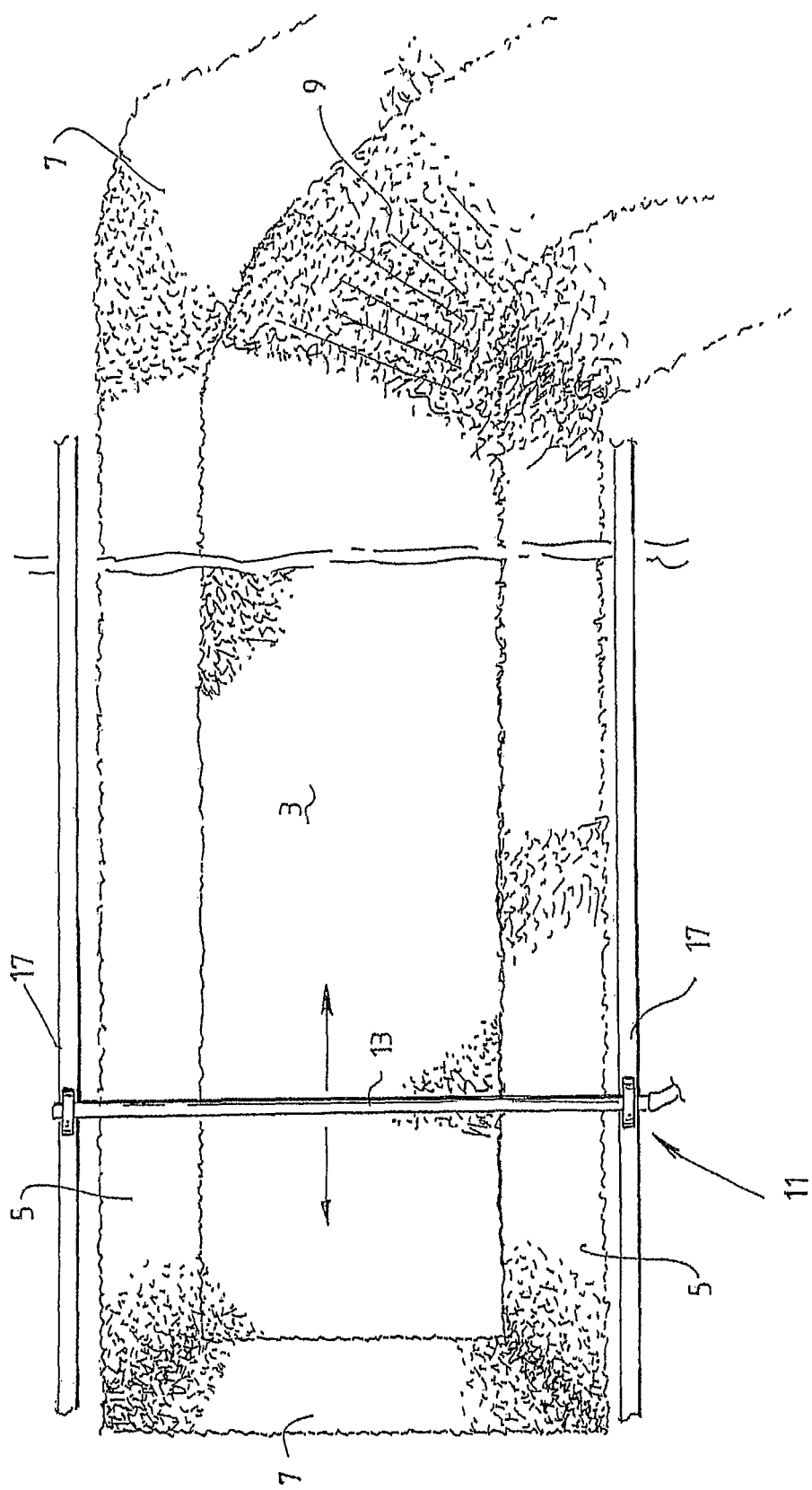

HEAP LEACHING

CROSS REFERENCE TO RELATED APPLICATIONS

This application claims priority as a continuation of U.S. patent application Ser. No. 10/516,387, filed on Aug. 9, 2005, which is the national stage of International Application No. PCT/AU03/00682, filed on May 30, 2003, the entire contents of each of which are expressly incorporated herein by reference.

BACKGROUND OF THE INVENTION

1. Field of the Invention

The present invention relates to a method of leaching a metal value from a heap of a metal-containing ore.

The present invention relates particularly to distributing leach liquors onto top surfaces of heaps in order to optimise leaching of the heaps.

U.S. Pat. No. 6,216,962 in the name of Krieg describes heap leaching in the following terms.

2. Description of the Prior Art

"In the commercial practice of hydrometallurgy, a bed of run-of-mine or granular low grade ore, known as a heap, is spread over an impervious base or pad which may comprise sheets of plastic film, asphalt and/or compacted clay. Crushed ore is normally heaped onto the pad to a depth to 10 to 30 feet and leveled off at the top of the heap. The ore is typically pre-crushed to a desired size."

"After the heap has been prepared, the target metal is leached from the ore by circulating the leaching solution through the heap in a process commonly known as percolation. To effect percolation, the solution is distributed over the top of the heap and permitted to seep down through the heap to the impervious pad. The impervious pad is typically sloped toward a drain pipe or channel for recovering the metal laden solution. The liquid that is distributed over the top of the heap may be a leaching solution comprising water mixed with a leaching agent, or a leaching agent may be premixed with the ore before the ore is spread onto the heap and relatively pure water is percolated through the heap."

The term "leach liquor" is herein understood to mean the liquid that is distributed over the top of a heap in a heap leaching method. As indicated in the above-quoted passages from the Kreig US patent, the liquid may be (a) a leaching solution that includes a leaching agent and water or (b) water—in situations where a leaching agent has been pre-mixed with ore in a heap.

There are a number of known options for distributing a leach liquor onto a top surface of a heap.

The options are generally based on the use of sprayer/sprinkler systems or drip systems positioned at various locations on top surfaces of heaps.

In some instances, the known options are relatively complicated. For example, U.S. Pat. No. 5,005,806 in the name of Krauth discloses a drip system that includes mainline pipes extending longitudinally along a side of a heap, parallel header pipes extending at spaced intervals from the main pipeline across the heap, and parallel, closely spaced tubes extending longitudinally between the header pipes, each tube having a plurality of outlets for leach liquor.

SUMMARY OF THE INVENTION

An object of the present invention is to provide an alternative option for distributing leach liquors onto top surfaces of heaps.

Generally, the known leach liquor distribution options supply low flow rates of a leach liquor onto a top surface of a heap, typically 5-15 $1/hr/m^2$ of top surface.

The present invention is based on the realisation that a more effective method of heap leaching is to supply higher flow rates of a leach liquor onto a heap and flood the heap.

According to the present invention there is provided a method of leaching a metal value from a heap of a metal-containing ore, which method includes:

(a) establishing a downward flow of a leach liquor through a section of the heap by supplying the leach liquor onto a top surface of the section and allowing the leach liquor (containing metal values in solution) to drain from a lower part of the section, and (b) supplying the leach liquor onto the top surface of the section at a flow rate that is sufficient so that the downwardly flowing leach liquor saturates the section of the heap.

Preferably step (a) includes establishing a plug flow of the leach liquor through the section of the heap and step (b) includes supplying the leach liquor at a flow rate that maintains the plug flow of the leach liquor and maintains saturation of the section of the heap.

Preferably the plug flow is relatively high velocity plug flow.

One, although not the only, option for supplying the leach liquor in step (b) includes supplying the leach liquor as a downwardly flowing curtain that contacts the top surface of the heap as a line or a narrow band that extends across the top surface and moving the curtain across the section of the heap continuously or in a series of steps.

Preferably the narrow band is less than 1 m wide.

More preferably the narrow is less than 0.75 m wide.

Preferably the curtain is continuous across the top surface of the heap.

The requirement that the downward flow of the leach liquor through the section of the heap "saturates" the section is understood herein to mean that the leach liquor effectively floods the section so that substantially all of the voids between ore particles in the section are filled with downwardly flowing leach liquor.

Preferably the flow rate is greater than 15 $1/hr/m^2$ of the top surface of the section.

More preferably the flow rate is greater than 20 $1/hr/m^2$ of the top surface of the section.

It is preferred particularly that the flow rate be greater than 25 $1/hr/m^2$ of the top surface of the section.

In some situations it is preferred particularly that that the flow rate be greater than 100 $1/hr/m^2$ of the top surface of the section.

It is understood herein that the term "flow rate" refers to the instantaneous flow rate and not a time-averaged flow rate, which might take into account 'rest periods' during which no leach liquor is applied onto the top surface of the heap.

The time period for supplying the leach liquor onto the top surface of the section and the flow rate of the leach liquor may be any suitable time period and flow rate having regard to relevant factors.

Relevant factors may include the ore type, the particle size distribution of the ore, the mechanical properties of the ore, the composition of the leach liquor, and the size of the heap.

Preferably the time period is a relatively short time period compared with typical time periods for supplying leach liquors to heaps using known sprayer/sprinkler systems and drip systems.

Preferably the time period is less than 4 hours per 24 hour period.

More preferably the time period is less than 3 hours per 24 hour period.

It is preferred particularly that the time period be less than 2 hours per 24 hour period.

Preferably the method includes supplying the leach liquor in step (b) via a distributor that can be moved over the surface of the heap.

The distributor may be of any suitable construction.

By way of example, the distributor may be a track mounted header pipe with a series of spaced-apart, spray outlets or an elongate slot outlet, and the distributor may be positioned so that the header pipe extends across the top surface of the heap and may be moved continuously or in the series of steps across the section of the heap and may supply the leach liquor as a curtain onto the top surface of the heap.

Preferably the method includes positioning a barrier on the top surface of the heap to retain and minimise run-off of the leach liquor supplied onto the top surface in step (b).

Preferably the top surface of the heap includes a series of furrows or other suitable troughs for retaining supplied leach liquor and minimising run-off of the leach liquor, and step (b) includes supplying the leach liquor into the furrows.

According to the present invention there is also provided a heap leaching operation that includes:
(a) a heap of a metal-containing ore; and
(b) a leach liquor distributor for supplying leach liquor onto a top surface of a section of the heap at a flow rate that is sufficient so that the downwardly flowing leach liquor saturates the section of the heap.

In one embodiment, the distributor is a track mounted header pipe with a series of spaced-apart, spray outlets or an elongate slot outlet.

Preferably the distributor is positioned so that the header pipe extends across the top surface of the heap and can be moved continuously or in the series of steps across the section of the heap and can supply the leach liquor as a curtain onto the top surface of the heap.

In another, although not the only, embodiment the heap operation includes a cover above the top surface of the heap and the distributor includes a network of header pipes attached to the underside of the cover with a series of spaced-apart spray outlets, such that leach liquor may be applied to the top and side surfaces of the heap.

BRIEF DESCRIPTION OF THE DRAWING

The present invention is described further by way of example with reference to the accompanying FIGURE that is a top plan view of a heap with a leach liquor distributor positioned on the heap.

DETAILED DESCRIPTION OF THE INVENTION

The heap shown in the FIGURE is a conventional construction with a top surface 3, sloping side walls 5, sloping end walls 7, and an access ramp 9 to allow vehicle access onto the top surface 3 of the heap.

Whilst not shown, the heap is set up to collect and transfer a leach liquor containing dissolved metal values from the base of the heap and to transfer the leach liquor for subsequent processing to recover the metal values (and the leach liquor), such as by solvent extraction and electrowinning techniques.

A leach liquor distributor, generally identified by the numeral 11, is positioned for movement along the length of the heap in the directions indicated by the arrows on the FIGURE.

The distributor 11 includes a header pipe 13 that is mounted on tracks 17.

The FIGURE illustrates two tracks 17 at opposite ends of the header pipe 13. However, depending on the circumstances, the distributor 11 may include a number of additional tracks 17 positioned at spaced intervals along the length of the header pipe 13 between the ends.

One end of the header pipe 13 is closed and the other end is connected to a source (not shown) of a leach liquor and a flow control system (not shown) for supplying the leach liquor to the header pipe 13.

The header pipe 13 includes a downwardly facing slot outlet (not shown) extending along the length of the header pipe 13 that overlies the heap for supplying the leach liquor as a downwardly flowing curtain onto the top surface 3 of the heap.

In accordance with a preferred embodiment of the method of the present invention, the distributor 11 is moved so as to traverse a section of the heap or the whole heap (in the case of a relatively small heap) and a leach liquor is supplied onto the top surface 3 of the section of the heap via the slot outlet at a flow rate that establishes and thereafter maintains high velocity plug flow of the leach liquor through the heap and thereby saturates the section of the heap.

Typically, the flow rate onto the top surface of the section will be more than 15 $l/hr/m^2$ of the top surface of the section as the distributor traverses any given section of the top surface.

Typically, the time period for supplying the leach liquor at the above flow rate onto the top surface of the section will be no more that 4 hours in total in a 24 hour period.

Depending on the circumstances, the distributor 11 may be moved continuously back and forward over the section of the heap or may be moved in steps and held at a particular location for a required time period before being moved to supply the leach liquor to an adjacent strip of the heap.

In addition, depending on the circumstances, it may be necessary to engineer the heap so that:
(a) the section of the heap can cope with high flow rates of the leach liquor that are supplied onto the top surface of the section of the heap in order to establish and maintain high plug flow of the leach liquor through the section of the heap, and
(b) the section of the heap can cope with the required high plug flow of the leach liquor and the consequential saturation conditions in the heap.

In some circumstances, the above considerations may make it necessary to flood a section of the top surface of the heap to provide a reservoir of the leach liquor. One option to achieve this objective is to locate a temporary barrier around the section of the heap to retain a reservoir of the leach liquor. Another option, which may be used in conjunction with the previous option, is to form a series of furrows (not shown) or other suitable troughs in the top surface of the section of the heap to retain a reservoir of the leach liquor. Another option, which may be used in conjunction with the previous options, is to select the particle size distribution of the ore particles in the heap to control the permeabilty of the heap. An important consideration in relation to these and any other options is to avoid run-off of the leach liquor from the top surface.

The above-described method has a number of advantages over known options for distributing leach liquors onto top surfaces of heaps. A major advantage is that the method makes it possible to increase the rate of recovery of metal values from an ore.

Many modifications may be made to the preferred embodiment of the present invention described above without departing from the spirit and scope of the present invention.

By way of example, whilst the header pipe 13 of the preferred embodiment includes a downwardly facing slot outlet for supplying the leach liquor onto the top surface 3 of the heap, the present invention is not so limited and extends to any suitable options for supplying the leach liquor. Another option includes a series of downwardly facing spray outlets in the header pipe 13 for supplying overlapping sprays of the leach liquor onto the heap. Another option includes an upwardly facing slot outlet in the header pipe 13 whereby the leach liquor flows from the outlet and down the side wall of the header pipe 13 and downwardly as a curtain of leach liquor.

In a situation where the heap is covered, a preferred embodiment of the invention is to attach the leach liquor distributor to the under surface of the cover. In this embodiment, the distributor includes a network of header pipes attached to the underside of the cover with a series of spaced-apart spray outlets, such that leach liquor may be applied to the top and side surfaces of the heap so as to provide high flow rates to either the entire heap or sections of the heap for any chosen time period.

The invention claimed is:

1. A method of leaching a metal value from a heap of a metal-containing ore, the method comprising:
   (a) establishing a downward flow of a leach liquor through a section of the heap by supplying the leach liquor onto a top surface of the section and allowing the leach liquor containing metal values in solution to drain from a lower part of the section, and
   (b) supplying the leach liquor onto the top surface of the section as a downwardly flowing curtain that contacts the top surface of the heap as a line or a narrow band that extends across the top surface and moving the curtain along the length of the section of the heap continuously or in a series of steps, the leach liquor supplied at a flow rate that is sufficient so that the downwardly flowing leach liquor saturates the section of the heap.

2. The method defined in claim 1, wherein step (a) comprises establishing a plug flow of the leach liquor through the section of the heap and step (b) comprises supplying the leach liquor at a flow rate that maintains the plug flow of the leach liquor and maintains saturation of the section of the heap.

3. The method defined in claim 2, wherein the curtain is continuous across the top surface of the heap.

4. The method defined in claim 2, wherein step (b) comprises supplying the leach liquor for a relatively short time period compared with typical time periods for supplying leach liquors to heaps using known sprayer/sprinkler systems and drip systems.

5. The method defined in claim 2, further comprising supplying the leach liquor in step (b) via a distributor that can be moved over the surface of the heap.

6. The method defined in claim 2, further comprising retaining and minimizing run-off of the leach liquor supplied onto the top surface in step (b) by positioning a barrier on the top surface of the heap.

7. The method defined in claim 2, further comprising retaining and minimizing run-off of the leach liquor supplied onto the top surface in step (b) by forming a series of furrows or other suitable troughs for leach liquor, and step (b) comprises supplying the leach liquor into the furrows.

8. The method defined in claim 1, further comprising supplying the leach liquor in step (b) at a flow rate that is greater than 15 l/hr/m$^2$ of the top surface of the section.

9. The method defined in claim 8, wherein the flow rate is greater than 20 l/hr/m$^2$ of the top surface of the section.

10. The method defined in claim 9, wherein the flow rate is greater than 25 l/hr/m$^2$ of the top surface of the section.

11. The method defined in claim 1, wherein step (b) comprises supplying the leach liquor for a relatively short time period compared with typical time periods for supplying leach liquors to heaps using known sprayer/sprinkler systems and drip systems.

12. The method defined in claim 11, wherein the time period is less than 4 hours per 24 hour period.

13. The method defined in claim 11, wherein the time period is less than 3 hours per 24 hour period.

14. The method defined in claim 11, wherein the time period is less than 2 hours per 24 hour period.

15. The method defined in claim 1, further comprising supplying the leach liquor in step (b) via a distributor that can be moved over the surface of the heap.

16. The method defined in claim 1, further comprising retaining and minimizing run-off of the leach liquor supplied onto the top surface in step (b) by positioning a barrier on the top surface of the heap.

17. The method defined in claim 1, further comprising retaining and minimizing run-off of the leach liquor supplied onto the top surface in step (b) by forming a series of furrows or other suitable troughs for leach liquor, and step (b) comprises supplying the leach liquor into the furrows.

* * * * *